Feb. 4, 1969 H. B. SCHEIFELE 3,425,758
SEAL FOR BEARING ASSEMBLY
Filed June 28, 1966
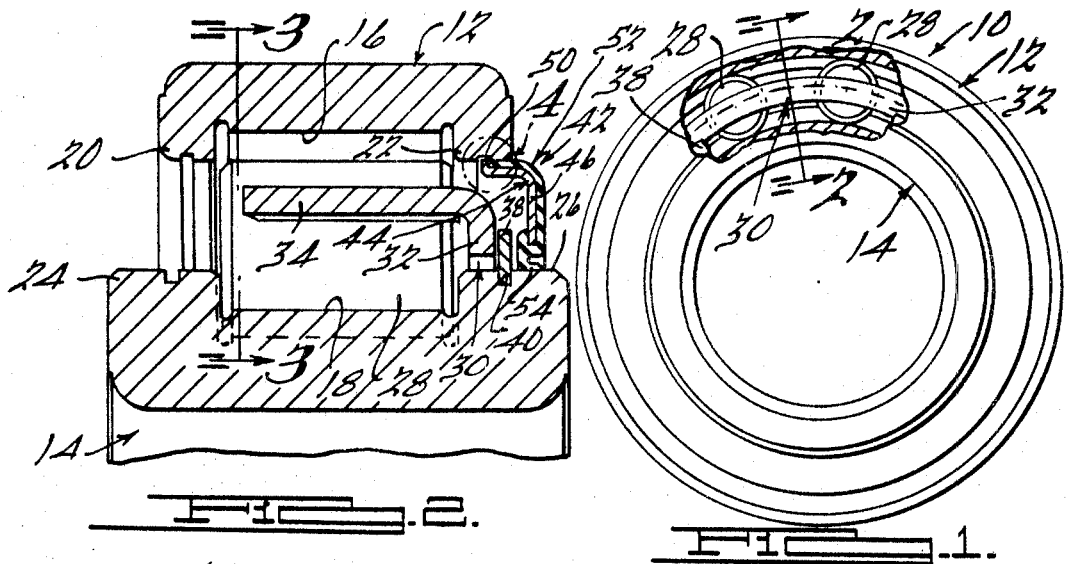
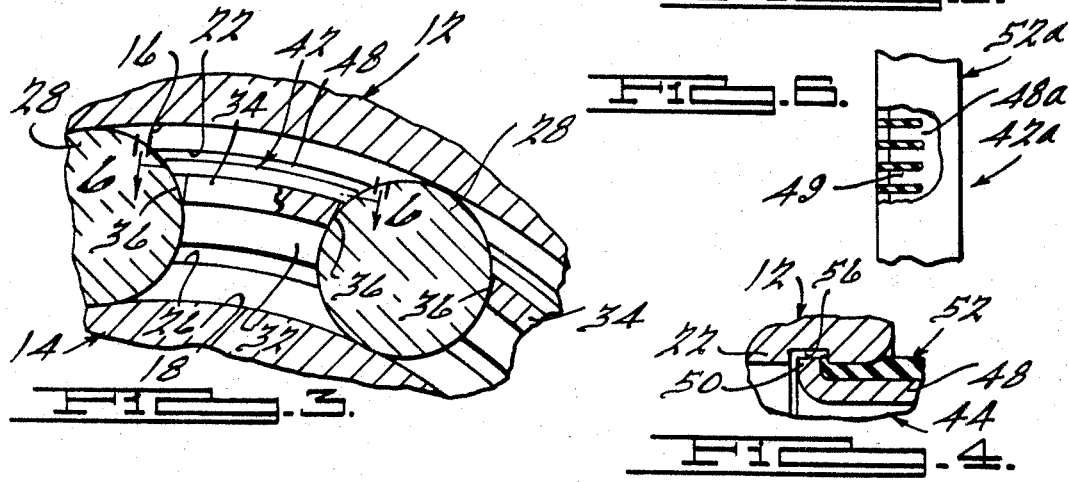
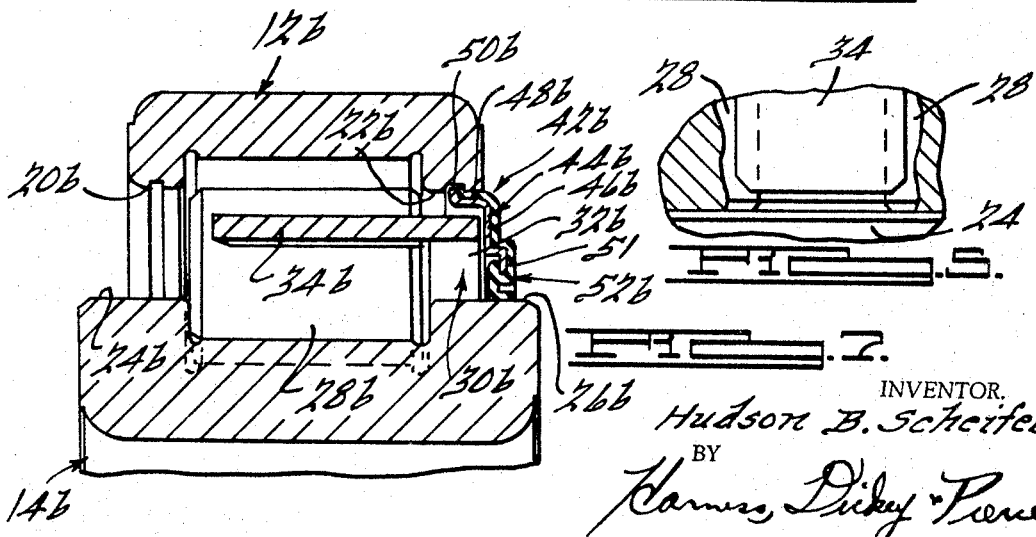
INVENTOR.
Hudson B. Scheifele
BY
Harness, Dickey & Pierce
ATTORNEYS.

United States Patent Office 3,425,758
Patented Feb. 4, 1969

3,425,758
SEAL FOR BEARING ASSEMBLY
Hudson B. Scheifele, Franklin, Mich., assignor to Federal-Mogul Corporation, a corporation of Michigan
Filed June 28, 1966, Ser. No. 561,273
U.S. Cl. 308—187.2          8 Claims
Int. Cl. F16c 1/24, 33/78; F16j 15/34

ABSTRACT OF THE DISCLOSURE

A bearing assembly having a plurality of rollers assembled in a pair of race members. A seal including a cup-shaped resilient support member having an axially extending rim portion with a lip portion extending radially from the rim portion and a flexible sealing member secured to the support member and engageable with both race members. The bearing has a cage for the rollers and means for limiting axial movement of the cage.

---

The present invention relates to seals for bearing assemblies as well as to a combination seal and bearing assembly.

In the present invention, a roll guided cage of the finger type is shown having a construction in which the fingers can be freely moved into and out from between pairs of rollers. In one form of the invention, a novel seal is shown which has not only a sealing effect but also axially restrains the cage and keeps it in assembly relationship with the rollers. Therefore, it is an object of the present invention to provide a novel bearing assembly having a novel seal construction.

It is another object of the present invention to provide a bearing assembly comprising a finger-type retainer and a seal which provides a sealing function and a function for retaining the finger-type cage.

In the present invention a novel seal construction is shown for use with bearing assemblies in which one of the races is of a relatively narrow width. Therefore, it is an object of the present invention to provide a novel bearing seal for use with bearing races in which at least one of the races is of a substantially narrow width.

It is another general object of the present invention to provide a novel seal construction.

Other objects, features, and advantages of the present invention will become apparent from the subsequent description and the appended claims, taken in conjunction with the accompanying drawings, in which:

FIGURE 1 is a front elevational view with some parts shown broken away of a bearing assembly embodying features of the present invention;

FIGURE 2 is a sectional view, to increased scale, of the assembly of FIGURE 1 taken substantially along the line 2—2 in FIGURE 1;

FIGURE 3 is a sectional view taken along the line 3—3 in FIGURE 2;

FIGURE 4 is a fragmentary view to increased scale generally of that portion of the assembly shown in FIGURE 2 and in the circled area designated by the numeral 4;

FIGURE 5 is a sectional view taken along the line 6—6 in FIGURE 3;

FIGURE 6 is a fragmentary view with some parts broken away of a modified form of seal; and FIGURE 7 is a sectional view similar to that of FIGURE 2 depicting a modified form of the assembly shown in FIGURE 2.

Looking now to the drawing in FIGURE 1, a bearing assembly is generally indicated by the numeral 10 and includes an outer race 12 and an inner race 14. The races 12 and 14 are provided with annular raceways 16 and 18, respectively. Outer race 12 has a pair of annular shoulders 20 and 22 while inner race 14 has a pair of annular shoulders 24 and 26. A plurality of straight rollers 28 are located in the raceways 16 and 18 and are separated one from another by a cage 30. The cage 30 has an annular generally radially extending flange portion 32 from which a plurality of fingers 34 axially extend. Adjacent ones of the fingers 34 define pockets to receive the rollers and are spaced apart from each other a distance generally less than the diameter of the rollers 28 whereby the fingers 34 will be located radially outwardly of the roll circle of the rollers 28. At the same time the flange portion 32 is constructed to clear the shoulder 26 of the inner race 14 sufficiently such that the cage 30 will be supported upon and guided upon the rollers 28. The edges 36 of the fingers 34 are generally tapered to provide a good bearing surface with the rollers 28. Note that the fingers 34 are not axially bent and extend between adjacent rollers 28 without interference with the rollers 28 and, hence, the cage 30 is free to be moved axially into and out of engagement with the rollers 28; this feature facilitates the assembly of the cage 30. In order to axially retain the cage 30, a snap ring or retaining ring 38 is located in an annular groove 40 in the shoulder 26 and is located proximate to and is engageable with the flange portion 32. By providing a clearance between the flange portion 32 and the shoulder 26 and by locating the fingers 34 above the roll circle of the rollers 28, the cage 30 is positively guided and supported by the rollers 28. The retaining ring 38 is located at a point of minimum clearance with and hence very close to the flange portion 32 of cage 30; the ring 38, by engaging the flange portion 32, will guide the cage 30 in its radial excursions and hence minimize skewing and eliminate damage thereby. In this way the fingers 34 are maintained in proper alignment and the cage 30 will not skew. Thus, since there is no interference between the fingers 34 and rollers 28, i.e., no tabs or portions of the fingers 34 to be bent or to be moved into interference with the rollers 28, distortion of the cage 30 is precluded. At the same time it is a simple matter to axially retain the cage 30 to the rollers 28 by insertion of the snap ring 38 within the groove 40.

A seal 42 is located between the shoulder 22 and shoulder 26 of the inner race 12 and outer race 14, respectively. In the assembly 10, as shown in the drawings, the outer race 12 is of a relatively narrow width to accommodate some particular applications and, hence, the seal 42 must be offset to extend between the confronting surfaces of the shoulders 22 and 26 while clearing the cage 30 and the retaining ring 38. The seal 42 has a generally cup-shaped core or support member 44 which has a radially extending annular ring or flange portion 46 and an axially extending rim portion 48. The flange portion 46 has a central opening which clears the shoulder 26. At the same time the axially outer end of the rim portion 48 is turned radially outwardly to define a lip portion 50. The radially outer extremity of the lip portion 50 is of a diameter greater than the diameter of the shoulder 22. The member 44 is provided to be of a resilient material, such as steel to permit assembly. A rubber sealing member 52 extends over the outer surface of resilient core member 44 except for the radial extremity of the lip 50. By keeping this extremity of the lip 50 free, assembly of the seal 42 is facilitated. The sealing member 52 on the rim portion 48 is, however, of a thickness to extend substantially to the outer extremity of the lip portion 50 to provide for good sealing action in a manner to be described.

The sealing member 52 generally encloses the radially inner end of the flange portion 46 and has a sealing finger portion 54 which engages the shoulder 26. In assembly, the seal 42 is moved axially between outer race 12 and inner race 14. As a result of the interference between the lip portion 50 and the shoulder 22 the annular groove 56 receives the lip 50 to securely hold the seal 42 in place. At the same time, the rubber material of the seal member 52 at the radially outer surface of the rim portion 48 compressively engages the axially outer end of the shoulder 22 and provides a seal therewith. The finger portion 54 will compressively, resiliently engage the shoulder 26 to effectively seal the shoulder 26.

Note that the annular rim portion 48, as shown in FIGURES 1 through 4, is of a one-piece continuous ring construction. A modified form of the seal 42 is shown in FIGURE 6; in the description of the seal of FIGURE 6 components similar to like components of the seal 42 have been given the same number designation with the addition of the letter suffix "a." In FIGURE 6 the seal 42a has its rim portion 48a formed with a plurality of fingers 49; the fingers 49 can flex and, hence, facilitate the assembly of the seal 42a onto the bearing races. Note, however, that the rubber coating of the sealing member 52a forms a continuous annular ring and, hence, a complete seal is provided.

FIGURE 7 shows a different assembly in which the retaining ring 38 is eliminated. In the description of the embodiment of FIGURE 7, components similar to like components in the embodiment shown in FIGURES 1 through 4 are given the same numerical designation with the addition of the letter suffix "b."

Looking now to FIGURE 7, retainer 30b is generally of a straight cylindrical construction having a generally axially extending annular portion 32b from which the fingers 34b extend axially. Note that no flange, such as flange 32, is provided. Seal 42b has a resilient support member 44b which has a generally Z-shaped section and has a radially extending portion 46b which is located proximate to and in close clearance relationship with the annular portion 32b and is adapted to axially engage that portion whereby axial movement of the cage 30b is restrained and the cage 30b is guided during its radial excursions and skewing minimized. The outer lip portion 50b serves generally the same function as that of the lip 50 in the seal 42 and the annular rim portion 48b can be constructed in a manner similar to that of the rim portion 48 of the seal 42 or the modified rim portion 48a. A radially inner lip 51 terminates the resilient support 44b and the rubber coating of seal member 52b is located similarly to the seal member 52 on the seal 42 in that it generally extends over the axially outer surface of the support member 44b and has a finger portion 54a which provides a sealing effect with the shoulder 26b. Note, however, that with the construction of FIGURE 7, the retaining ring 38 can be eliminated and axial movement of the retainer 30b is restrained by the seal 42b and specifically by means of the engagement between the cage 30b and the ring portion 46b of the support member 44b. Also note that with the construction in FIGURE 7, the cage 30b can be of a simple construction.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. In a sealing and bearing assembly the combination comprising: a bearing assembly having a plurality of rollers assembled in a pair of race members, a seal comprising a generally cup-shaped resilient support member having an axially extending rim portion, a lip portion extending radially from the extremity of said rim portion and being locatable in an annular groove in one of said race members, a flexible sealing member secured to said support member and engageable with both said race members for providing a seal therebetween, said bearing assembly further including a finger-type cage free to move axially from said rollers in one direction, said support member having an annular ring portion connected at one end to said rim portion and, with said lip portion in said annular groove, said ring portion being located to engage said cage and axially retain said cage on said rollers and is in close clearance relationship with said cage whereby axial movement in said one direction and skewing of said cage are minimized.

2. The seal of claim 1 with said support member having an intermediate annular portion extending axially from said ring portion and an inner portion extending radially inwardly from said intermediate portion, said sealing member extending over said rim portion for compressively sealingly engaging that one of said race members when said lip portion is located in the groove and with said sealing member extending over said inner lip portion and terminating in a resilient finger structure for sealingly engaging the other of said race members and to provide a seal therewith.

3. The apparatus of claim 2 with said one of said race members being of a substantially narrower width than said other race member and with said rim portion and said intermediate annular portion extending axially a distance sufficient to locate said resilient finger structure away from said cage and at a point to sealingly engage said other race member.

4. The apparatus of claim 2 with said lip portion comprising a plurality of axially extending finger portions and with said sealing member defining a continuous sealing surface over said finger portion.

5. The apparatus of claim 1 with said support member having a ring portion extending radially from said rim portion and having an intermediate annular portion extending axially from said ring portion and an inner leg portion extending radially inwardly from said intermediate portion, said sealing member extending over said rim portion for compressively sealingly engaging that one of the race members when said lip portion is located in the groove and with said sealing member extending over said inner leg portion and terminating in a resilient finger structure for sealingly engaging the other race member and to provide a seal therewith.

6. The apparatus of claim 5 in which said rim portion comprises a plurality of axially extending finger portions and with said sealing member defining a continuous sealing surface over said finger portions.

7. In a sealing and bearing assembly the combination comprising a bearing assembly having a plurality of rollers assembled in a pair of race members, a seal for said bearing assembly, said seal comprising a generally cup-shaped resilient support member having an axially extending rim portion, a lip portion extending radially from the extremity of said rim portion and being locatable in an annular groove in one of the race members, a flexible sealing member secured to said support member and engageable with both race members for providing a seal therebetween, said sealing member extending over said rim portion and being compressively, sealingly engageable with the axially extending surface on that one of the race members adjacent the groove when said lip portion is located in the groove, said sealing member and said lip portion being generally in clearance relation in the groove whereby the sealing effect is substantially with the axially extending surface, said support member having a ring portion extending radially from said rim portion and with said sealing member extending over the free end of said ring portion and terminating in a resilient finger structure for sealingly engaging the other race member and to provide a seal therewith, said one of the race members being of a substantially narrower width than said other and said bearing assembly including components extending axially between the races generally to the end of said one of the race members but substantially short of the end of said other of the race members, said rim portion generally extending a distance from the annular groove to a point between the end of said components and the end of said other race member whereby said finger structure will sealingly engage said other race member, said components comprising a finger-type cage and a locking ring secured to the other race member for axially retaining the cage.

8. The seal of claim 7 in which said rim portion comprises a plurality of axially extending finger portions and with said sealing member defining a continuous sealing surface over said finger portions.

References Cited
UNITED STATES PATENTS

| | | | |
|---|---|---|---|
| 1,358,848 | 11/1920 | Hindle et al. | 308—217 |
| 2,198,376 | 4/1940 | Cederberg | 308—212 |
| 2,275,307 | 3/1942 | Murden | 308—187.2 X |
| 2,755,113 | 7/1956 | Baumheckel | 308—187.2 |
| 2,834,616 | 5/1958 | Gebert et al. | 308—187.1 X |
| 2,915,345 | 12/1959 | Workman | 308—187.2 |
| 3,301,616 | 1/1967 | Wilson et al. | 308—217 |

CARROLL R. DORITY, JR., *Primary Examiner.*

U.S. Cl. X.R.

308—217; 277—94, 95, 168